Jan. 30, 1962  A. S. PARKS  3,018,797
VALVES
Filed July 28, 1958  2 Sheets-Sheet 1

Asbury S. Parks
INVENTOR.

BY Vincent Martin
Joe E. Edwards

ATTORNEYS

Jan. 30, 1962

A. S. PARKS 3,018,797

VALVES

Filed July 28, 1958

Asbury S. Parks
INVENTOR.

BY Vincent Martin
Joel E. Edwards

ATTORNEYS.

3,018,797
       # VALVES
Asbury S. Parks, 3 E. Rivercrest Drive, Houston, Tex.
         Filed July 28, 1958, Ser. No. 751,205
              5 Claims. (Cl. 137—627.5)

This invention relates to new and useful improvements in valves.

The invention relates particularly to the type of valve which is generally referred to as a three-way, three position valve since it controls flow through three conductors having connection with said valve. Basically, a three-way valve includes an upper valve seat and a lower valve seat with upper and lower valve members disposed between said seats and adapted to co-act therewith. A single operating stem has connection with the valve members which are usually urged toward a seated position by a spring means. With the operating stem in a neutral position, both valve members are seated; however, upward movement of the stem unseats the lower valve member and downward movement of the stem unseats or opens the upper valve member. The different positions of the valve members control the flow to and from the three conductors.

Although this usual type of three-way valve is in general use, all such valves have a serious disadvantage in that it has been the practice to extend the operating stem completely through both upper and lower valve members whereby said members are, in effect, slidable within limits on said stem. With this type of construction, it becomes immediately apparent that both valve members which surround the stem must necessarily be larger in diameter than the stem and this, in turn, means that the size of the opening in the valve seat with which the valve members co-act cannot be reduced to less than the diameter of the stem.

In certain installations it is desirable because of high pressure differential across the valve seat that the opening thereof be small; in many instances smaller than the diameter of the operating stem but this is impossible with the usual valve now in general use. Also the sealing problems which arise in providing a seal between a valve member and its operating stem where the stem extends entirely therethrough become difficult especially when the valve member is sealing against relatively high pressures.

It is, therefore, one object of this invention to provide an improved three-way valve which is so constructed that at least one of the valve seats, preferably the lower one, in the assembly, may be of any desired size and the opening therethrough is in no way limited to being larger than the operating stem of the valve members, whereby said valve will operate more efficiently under high pressure conditions.

Another object is to provide an improved valve of the three-way type wherein the lower valve member, although connected with the operating stem, does not have said stem extending entirely therethrough whereby not only is there no limitation as to minimum size of opening through the lower valve seat but also sealing problems in connection with the seal between said lower valve member and stem are completely eliminated.

Another object is to provide a valve, of the character described, wherein the valve members are so mounted on the valve stem that when one valve member is unseated by actuation of the stem, the force holding said member unseated is transmitted through the member to the other valve member to assist in maintaining the latter in its seated position.

A further object is to provide a valve of the character described having a more effective sealing means between the stem and valve members and also including improved means for removably retaining the valve seat elements of the assembly in position, whereby said seat elements may be quickly and easily replaced when required.

The construction designed to carry out the invention will be hereinafter described, together with other features thereof.

The invention will be more readily understood from a reading of the following specification and by reference to the accompanying drawings forming a part thereof, wherein an example of the invention is shown, and wherein.

Figure 1:
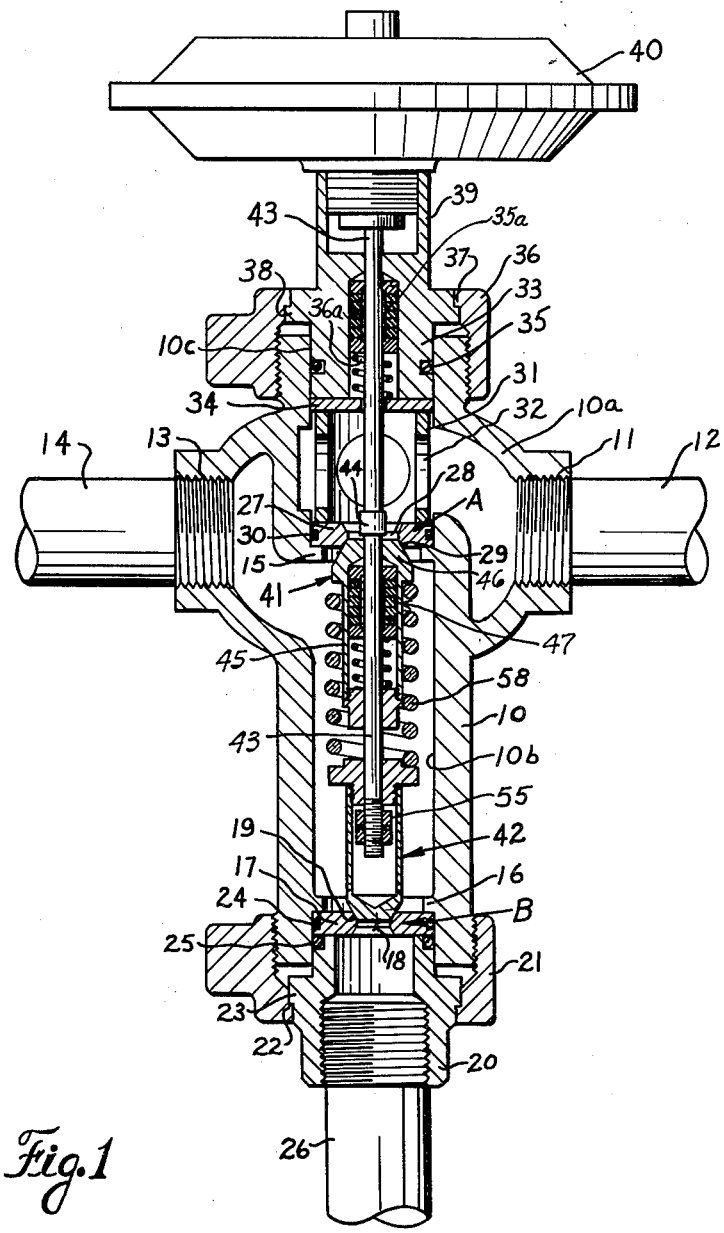
FIGURE 1 is a vertical sectional view of a valve, constructed in accordance with the invention and showing the valve members in seated position.

In the drawings the numeral 10 designates an elongate valve body having an enlarged generally globe shaped portion 10a at its upper portion. A threaded port 11, which receives the end of a pipe or conductor 12, is formed at one side of the enlarged portion of the valve body while a similar port 13 is located diametrically opposite the port 11. A suitable pipe or conductor 14 is connected with the port 13. Within the enlarged portion of the valve body, an annular valve seat support 15 is located and an upper valve seat A is mounted on the support. As is clearly shown in FIGURE 1, the valve seat A is disposed between the ports 11 and 13 so that flow from the conductor 12 to the conductor 14 must pass through the valve seat.

The lower portion of the valve body is generally cylindrical and is formed with a bore 10b having an open lower end. Spaced upwardly from the lower end is an internal annular flange 16 and a lower valve seat B is adapted to abut the underside of said flange. The lower valve seat comprises an annular ring 17 having an opening 18 and the upper end of said opening is beveled or inclined to form a seating surface 19. The lower valve seat is retained in position abutting the underside of the annular flange 16 by a retaining collar 20; the collar is retained in position by an annular nut 21 which is threaded onto the lower end of the valve body and which has an internal shoulder 22 co-acting with an external flange 23 provided on the retaining collar 20. Suitable packing rings 24 and 25 seal between the bore of the valve body and the valve seat ring 17 and retaining collar 20 respectively. A pipe or conductor 26 is threaded into the retaining collar and communicates with the bore 10b of the valve body.

It will be evident that the lower valve seat B is readily removable by merely removing the nut 21 which permits the retaining collar and valve seat to be withdrawn from the bore of the valve body. Thus the lower seat may be readily removed for replacement or to insert a valve having a different size axial opening therethrough.

The upper valve seat A, which is located within the enlarged portion 10a and is, therefore, spaced from the lower valve seat B, comprises an annular seat ring 27 having an axial opening 28 extending therethrough. An inclined seating surface 29 is formed on the underside of the ring and surrounds the opening. A suitable seal ring 30, located in the periphery of the seat ring 27, provides an effective seal between said ring and the support 15.

The upper valve seat ring 27 is retained in position on the support 15 by a spacer sleeve 31 which has its lower end engaging the upper surface of said ring; the spacer sleeve is formed with suitable flow ports or openings 32. The spacer sleeve is maintained in position by an upper retaining element or collar 33 which is insertable within the upper portion 10c of the bore of the valve body. If desired, a suitable washer 34 is interposed between the lower end of the retaining collar 33 and the upper end of the retaining sleeve 31, this collar functioning to retain the spring 36a of a wear compensating packing assembly 35a which seals off around a valve operating stem 43. A suitable packing ring 35 seals off between the collar 33 and the wall of the bore. The collar 33 is slidable within that portion 10c of the bore of the body and is held in position by a retaining nut 36 threaded onto the upper end of the body, the nut being provided with an overhanging flange 37 which engages over an external flange 38 formed on said collar 33. The retaining assembly is similar to that shown in my prior Patent No. 2,665,711.

The retaining collar 33 may be formed integral with the lower end of a diaphragm case assembly which includes an annular support 39 upon which is mounted the diaphragm case 40. A pressure actuated diaphragm (not shown) is mounted within the case.

It will be apparent that replacement of the upper valve seat ring 27 may be accomplished by merely removing the retaining nut 36. Thereafter, the retaining collar 33, sleeve 31 and valve ring 27 may be lifted upwardly through the opening 10c provided in the upper end of the valve body.

To control flow through the valve seats A and B, the pair of valves 41 and 42 are provided and these valves are mounted upon an operating stem 43. The stem 43 has its upper end secured to the diaphragm within the diaphragm case 40 and extends downwardly through the retaining collar 33, sleeve 31 and through the upper valve seat ring 27. Valve 41, which will be hereinafter referred to as the upper valve, surrounds the stem below the valve seat ring 27 while the valve 42 is connected to the lower end of the stem as will be explained.

Figure 2:
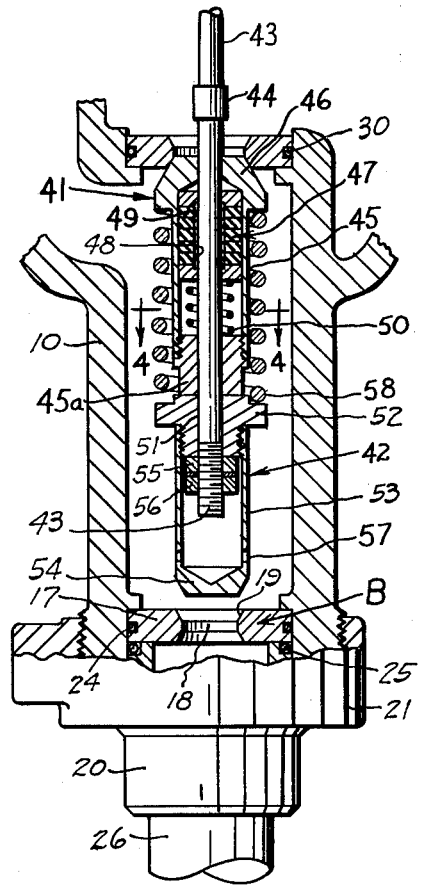
FIGURE 2 is a partial sectional view illustrating the upper valve in closed position with the lower valve in open position.
Figure 3:
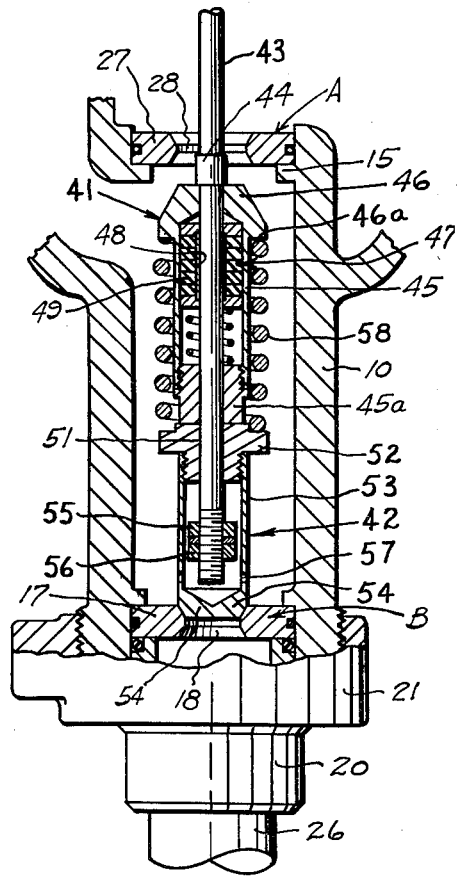
FIGURE 3 is a view similar to FIGURE 2 with the lower valve closed and the upper valve open.
Figure 4:
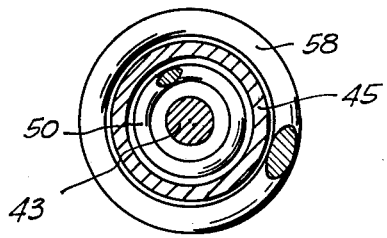
FIGURE 4 is a horizontal cross-sectional view taken on the line 4—4 of FIGURE 2.

The stem 43 is formed with an enlargement or collar 44 and the upper valve 41 is disposed below such enlargement or collar as is clearly illustrated in FIGURES 2 and 3. The upper valve member 41 is formed of a cylindrical body 45 having a valve head 46 at its upper end and said body is slidable within limits upon the stem 43. A suitable packing assembly 47, which may be a combination rubber and Teflon seal such as is disclosed in my prior Patent No. 2,567,527, is located within the bore of the valve body 45 and seals off around the stem 43; this packing includes a sealing sleeve 48 which is constructed of Teflon or similar sealing material, said sleeve being surrounded with elastic packing rings 49 which maintain the sleeve 48 in sealing position. A light coil spring 50 in the packing assembly takes up the wear and maintains the seal.

The lower end of the valve operating stem 43 projects downwardly through the bore 51 of a flanged collar 52 which is secured to the upper end of the lower valve member 42. The lower valve member includes a tubular body 53, the upper end of which receives the flanged collar 52 and the lower end of which is closed to form the valve head 54. The valve head is, of course, bevelled to engage the lower seat B. The extreme lower end of the stem 42 projects into the bore of the tubular body 53 and has a nut 55 threaded thereon which is adapted to engage the underside of the flanged collar 52 when the stem is moved upwardly to thereby impart upward movement to the lower valve member 42; the nut 55 thus provides an abutment or enlargement on the stem and being threaded thereon is adjustable with its adjustment being maintained by means of a lock nut 56. It is noted that the provision of nut 55 and flanged collar 52 facilitates assembly of the upper valve member and spring 58 upon the stem and allows the spring to be pre-loaded to any desired degree; thereafter the lower valve is threaded onto the collar 52 to complete the assembly.

It is apparent that the lower end of the stem 43 does not extend entirely through the lower valve member 42 but merely projects through the flanged collar 52 and into the bore of the valve housing 33. Therefore, no seal is needed between the extreme lower end of the stem 43 and the valve member 42 and in order to equalize pressures around the housing 53 of said valve member, the wall of the housing may be provided with suitable equalizing ports 57. To normally urge the upper valve member 41 upwardly on the stem 43 and toward the enlargement or abutment 44 while at the same time urging the lower valve member downwardly into engagement with the enlargement or nut 55 on said stem, a coil spring 58 is provided. This spring surrounds the housing 45 of the upper valve membr and has its upper end engaged by an annular shoulder 46a formed at the lower end of the upper valve head 46; the lower end of the spring 58 engages the flanged collar 52 which is secured to the lower valve member 42 and the spring constantly exerts its pressure to urge the valve members 41 and 42 in a direction away from each other, that is the upper valve member is urged upwardly toward the enlargement 44 while the lower valve member is urged downwardly toward the enlargement or nut 55. When the operating stem 43 is in a neutral position as shown in FIGURE 1, the spacing between the enlargements 44 and 55 is such that both valve members 41 and 42 are engaged with the valve seats A and B respectively and these valve members are maintained in seated position by the strength of the spring 58.

When the diaphragm (not shown) is operated to move the stem 43 upwardly, such upward movement will cause the enlargement 55 at the lower end of the stem to engage the underside of the flanged collar 52 and this will result in an upward movement of the lower valve member 42 to unseat the same. This movement is, of course, against the strength of the spring 58. Upward movement of the stem continues until the upper surface of the flanged collar 52 engages the lower end of an annular closure plug 45a which is threaded into the lower end of the tubular body of the upper valve element. Thereafter, any force on stem 43 in an upward direction, not only maintains the lower valve member 42 unseated as shown in FIGURE 2, but this force is also transmitted to the upper valve member 41 to assist in maintaining this valve member in seated position. It is, of course, evident that as the spring 58 is compressed to permit the lower valve member to move to the unseated position shown in FIGURE 2, the force of the spring is acting to maintain the upper valve member 41 closed.

When the lower valve member 42 is unseated, the opening through the lower valve seat B is open and a communication is established between the conductor or line 14 connected in the port 13 and the conductor 26 which is extended from below the lower valve seat B. At the same time communication between the conductor 14 and the other conductor 12, which has connection with port 11 in the valve body, is shut off.

When the pressure applied to the diaphragm (not shown) in diaphragm case 40 is such as to impart a downward movement to the valve stem 43, the enlargement 44 will move downwardly to engage the upper valve member 41 and will first move said valve member downwardly against the spring 58 until the lower end of the upper valve member 41 engages the upper end of the lower valve member. Such position is illustrated in FIGURE 3 and this results in unseating the upper valve member 41 whereby communication between conductors 12 and 14 is established while communication between conductors 14 and 26 is shut off. Since the upper valve element will engage the lower valve element as indicated in FIGURE 3, any downward force on the stem 43 will thereafter be added to the force of the spring 58 to maintain the lower valve in its closed position.

By arranging the valve members 41 and 42 in the manner described, it is only necessary to provide a seal around the upper valve member 41. The lower valve member 42 has its lower end closed and the operating stem is not required to extend completely through the valve head 54 of the lower valve. Therefore, the diameter of the valve head 54 of the lower valve member is not in any way restricted to being at least larger than the stem with the result that the valve head of the lower valve member 42 may be made as small as desirable in accordance with pressure conditions. Also, by constructing the lower valve member in this manner, no seal is required between the lower member and the stem which greatly simplifies construction and eliminates a sealing problem at this point. The use of the particular seal arrangement illustrated in connection with the upper valve element 41 provides for a self-energizing seal which automatically compensates for wear and which effectively seals under the higher pressures.

Figure 5:
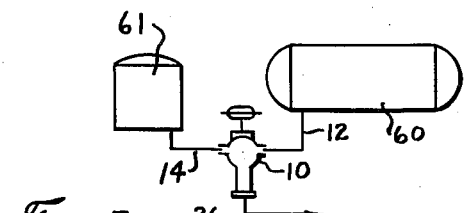
FIGURE 5 is a schematic diagram illustrating one use of the improved valve.

The particular advantage of a construction which allows the lower valve member 42 to be constructed of as small a size as conditions dictate makes the valve acceptable for use in certain applications wherein the upper valve member controls a flow which develops a low pressure differential across the seat A, while the lower valve controls a flow which develops a high pressure differential across the lower seat B. In such instances it is desirable that the upper valve seat A have a large opening while the lower valve seat B have a relatively small opening. An example of such an application is illustrated in FIGURE 5 wherein the valve is employed as a control between a well fluid separator 60 and a metering separator 61. As shown, the valve body 10 is located between the main separator and the metering separator with line or conductor 12 extending from the separator 60 to the valve body 10 and conductor 14 extending from the body to the metering separator 61. Conductor or line 26 extending from the valve body 10 would be connected to storage.

As is well known, the purpose of a metering separator is to meter the oil which is produced and after separation in the main separator 60, the oil is passed to the metering separator which is of a predetermined capacity such as, for example, one barrel. Therefore, flow from the main separator 60 is through conductor 12 past the upper valve seat A and into the metering separator. This develops a relatively low differential pressure across the seat A because flow is usually by gravity; it is therefore desirable that the opening in the upper valve seat A be relatively large.

After the predetermined volume of liquid has passed to the metering separator, a suitable float or other mechanism in said metering separator actuates the valve 10 to close the upper valve member and open the lower valve member. At this time communication is established between conductor 14 and outlet line 26 through the lower valve seat B. Normally conductor 26 extends to a tank at atmospheric pressure and thus the well liquids from the metering separator, which are usually under a considerable pressure, are flowing from the metering separator to atmosphere. For this reason, a relatively high pressure differential occurs across the seat B and a small port in the lower valve seat B is desirable in order to lessen the force of fluid which is passing therethrough. Also by providing a smaller port in the lower valve seat B, the thrust which is required to lift the lower valve member 42 from its seat is reduced and an easier operation is obtained. Furthermore, in addition to the advantage of permitting a smaller port to be employed in the lower valve seat, the structure eliminates any type of seal between the lower valve member 42 and the valve stem. This seal would, of course, be subjected to the higher pressure differential which would encourage leakage and by the elimination of any pressure seal between the parts, the efficiency of operation is greatly increased.

Although the valve has been described as used in connection with a metering separator, it is evident that it may be employed in any installation where it is desirable to control the flow to and from a common conductor wherein the flow to the common conductor may be under one pressure differential condition across one valve seat and flow from said common conductor is under a different pressure differential condition across the other valve seat. Although the particular type of seal illustrated as sealing between the operating stem and the upper valve member has been found satisfactory, it is evident that other types may be employed.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A valve including, a valve body having a lower tubular portion and an enlarged upper portion, the tubular portion having a bore open at its lower end, a valve seat support within the enlarged upper portion, said body having an access opening aligned with the valve seat support, an upper valve seat insertable through the access opening and engageable with the support, retaining means also insertable through the access opening and engageable with the valve seat and having its end portion projecting outwardly from the body, means for securing the retaining means to the valve body, a lower valve seat mounted in the lower end of the tubular portion of the valve and in axial alignment with the upper valve seat, a pair of valve members between said seats, each valve member co-acting with one of the valve seats to control flow therethrough, resilient means acting upon said valve members to constantly urge the members toward engagement with their respective seats, the valve member co-acting with the upper valve seat being tubular, the valve member co-acting with the lower valve seat having a solid valve head which has its external surface substantially free of projections, whereby no limitation as to minimum size is placed upon the opening through the lower valve seat, an operating stem extending into the body and through the upper tubular valve member and having is lower end connected to the lower valve member, means on the stem engageable with the tubular valve member when the stem is moved in one direction to unseat said tubular valve and additional means on the stem engageable with the lower valve member when the stem is moved in an opposite direction to unseat said other valve member.

2. A valve as set forth in claim 1 wherein the lower valve seat is insertable within the open lower end of the tubular portion, a retaining element engageable with the under side of said valve seat to support it in position, and means adapted to be attached to the tubular body for maintaining the retaining element in position.

3. A valve including a valve body, an upper valve seat within the body, a lower valve seat spaced from the upper seat in axial alignment and opposed relationship thereto, an operating stem extending downwardly into the valve body through the upper valve seat and having its lower end terminating above the lower valve seat, a tubular valve assembly mounted upon the operating stem and comprising an upper tubular valve member which surrounds the stem and is adapted to engage the upper valve seat, an annular collar member surrounding the stem below the upper valve member, retaining means adjustably secured to the lower extremity of the stem and engageable with the underside of the collar whereby the collar is retained against downward displacement on the stem by said retaining means, a coil spring confined between the upper valve member and the collar and exerting its force to urge the upper valve member upwardly relative to the stem and to at the same time urge the collar downwardly on the stem, the adjustment of the retaining means on the lower extremity of the stem controlling the loading of the coil spring, said upper valve member being engageable with the upper valve seat, and a lower valve member having a solid valve head portion at its lower end engageable with the lower seat and having its upper end adjustably attached to the collar, whereby the spring is, in effect, confined between the two valve members and constantly exerts its force to move said members toward their seated positions, said lower valve member being below the lower end of the stem so that the stem does not project through the lower valve member, whereby the outer surface of its solid valve head portion is free from external projections.

4. A valve as set forth in claim 3, together with a sleeve-type sealing means surrounding the operating stem and disposed within the upper tubular valve member, and a spring co-acting with the sealing means to compensate for any wear to assure maintenance of tight sealing engagement of the sealing means wtih the stem.

5. A valve as set forth in claim 3 wherein the retaining means which engages the underside of the collar on said stem also acts as a telescoping connection between the lower valve member and the stem so that movement of the operating stem in an upward direction will result in an unseating of the lower valve member, and an enlargement on the stem above the upper valve member adapted to engage said upper valve member when the stem is moved downwardly whereby downward movement of the stem will unseat the upper valve member.

References Cited in the file of this patent
UNITED STATES PATENTS

| | | |
|---|---|---|
| 962,516 | Mueller | June 28, 1910 |
| 1,114,360 | Hornung | Oct. 20, 1914 |
| 2,160,536 | Buning | May 30, 1939 |
| 2,227,542 | Grove | Jan. 7, 1941 |
| 2,665,711 | Parks | Jan. 12, 1954 |
| 2,703,105 | Stoner | Mar. 1, 1955 |
| 2,825,361 | Seljos | Mar. 4, 1958 |
| 2,883,145 | Sage | Apr. 21, 1959 |
| 2,892,608 | Collins | June 30, 1959 |
| 2,942,622 | Hahn et al. | June 28, 1960 |